(12) United States Patent
Garces et al.

(10) Patent No.: US 11,006,647 B2
(45) Date of Patent: May 18, 2021

(54) SYSTEM AND METHOD FOR REGULATING THE FLOW OF SMOKE IN AN INDOOR SMOKER

(71) Applicant: Haier US Appliance Solutions, Inc., Wilmington, DE (US)

(72) Inventors: Tomas Garces, Louisville, KY (US); Daniel Carballo, Louisville, KY (US); Symon James Harrah, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 240 days.

(21) Appl. No.: 16/102,906

(22) Filed: Aug. 14, 2018

(65) Prior Publication Data
US 2020/0054033 A1 Feb. 20, 2020

(51) Int. Cl.
*A23B 4/052* (2006.01)
(52) U.S. Cl.
CPC .................... *A23B 4/0523* (2013.01)
(58) Field of Classification Search
CPC .................................................. A23B 4/0523
See application file for complete search history.

(56) References Cited

U.S. PATENT DOCUMENTS

| | | | |
|---|---|---|---|
| 5,368,872 A * | 11/1994 | Davis, Jr. | A23B 4/052 426/281 |
| 6,868,777 B1 | 3/2005 | Higgins | |
| 9,198,443 B2 | 12/2015 | Davis | |
| 2014/0060467 A1* | 3/2014 | Fong | F16K 3/085 123/90.1 |
| 2014/0360387 A1 | 12/2014 | Bogdon | |
| 2017/0215641 A1* | 8/2017 | DeBruler | A47J 37/0704 |
| 2017/0369785 A1* | 12/2017 | Aupperle | C10B 1/02 |

* cited by examiner

*Primary Examiner* — Ibrahime A Abraham
*Assistant Examiner* — Dilnessa B Belay
(74) *Attorney, Agent, or Firm* — Dority & Manning, P.A.

(57) ABSTRACT

An indoor smoker includes a smoking chamber, a fresh air supply duct, a firebox defining a smoldering chamber, and an exhaust duct. An air handler is operably coupled to the exhaust duct and is configured for urging a flow of fresh air and/or smoke through the smoking chamber and out the exhaust duct which contains a catalytic converter. A flow regulating device, such as a rotary valve, is rotated between angular positions to control the flows of air and smoke, e.g., to facilitate a smoking process, a cold smoking process, a pause in the smoking process, or process termination.

19 Claims, 7 Drawing Sheets

POSITIONING A ROTARY VALVE IN A SMOKING POSITION WHERE A FRESH AIR OUTLET IS BLOCKED AND A SMOLDERING CHAMBER IS A FLUID COMMUNICATION WITH A SMOKING CHAMBER OF AN INDOOR SMOKER — 310

POSITIONING THE ROTARY VALVE IN AN EVACUATION POSITION WHERE A FIREBOX OUTLET IS BLOCKED AND A FRESH AIR SUPPLY DUCT IS IN FLUID COMMUNICATION WITH THE SMOKING CHAMBER — 320

POSITIONING THE ROTARY VALVE IN A PAUSE POSITION WHERE THE FIREBOX OUTLET IS PARTIALLY OPEN TO AN EXHAUST DUCT AND THE FRESH AIR OUTLET IS PARTIALLY OPEN TO THE SMOKING CHAMBER — 330

POSITIONING THE ROTARY VALVE IN A COLD SMOKING POSITION WHERE THE FRESH AIR SUPPLY DUCT AND THE SMOLDERING CHAMBER ARE IN FLUID COMMUNICATION WITH THE SMOKING CHAMBER — 340

OPERATING AN AIR HANDLER AT DIFFERENT SPEEDS TO RANDOMIZE THE FLOW OF SMOKE WITHIN THE SMOKING CHAMBER — 350

FIG. 9

SYSTEM AND METHOD FOR REGULATING THE FLOW OF SMOKE IN AN INDOOR SMOKER

FIELD OF THE INVENTION

The present subject matter relates generally to indoor smokers, and more particularly to systems and methods of smoke regulation in indoor smokers.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

During a cooking or smoking process, it is frequently desirable to regulate the flow of smoke and/or fresh air into the smoking chamber, e.g., to supply the desired amount of smoke or to supplement the smoke with fresh air, e.g., to facilitate a cold smoking process. In addition, it may frequently be desirable to evacuate the smoking chamber to permit access to the smoking chamber without releasing smoke into the surrounding environment. For example, it may be desirable to pause the smoking process (without asphyxiating the combustible material), e.g., to check the food, to take an internal temperature measurement, or to "mop" the food with sauce or marinade.

Accordingly, a smoker that has features for improved smoke regulation during a smoking operation would be useful. More specifically, an indoor smoker that has features allowing a user to introduce cold smoke or pause, terminate, or continue a smoking process would be particularly beneficial.

BRIEF DESCRIPTION OF THE INVENTION

Aspects and advantages of the invention will be set forth in part in the following description, may be apparent from the description, or may be learned through practice of the invention.

In one aspect of the present disclosure, an indoor smoker defining a vertical, a lateral, and a transverse direction is provided. The indoor smoker includes a cabinet, a smoking chamber positioned within the cabinet, and a fresh air supply duct extending between a fresh air inlet and a fresh air outlet and being configured for receiving a flow of fresh air. A firebox defines a firebox inlet, a firebox outlet, and a smoldering chamber for receiving combustible material and generating a flow of smoke. An exhaust duct extends between a chamber outlet and a discharge vent, and a flow regulating device is operably coupled to the fresh air outlet, the firebox outlet, and the chamber outlet for regulating the flow of fresh air and the flow of smoke within the cabinet.

In another aspect of the present disclosure, a method of operating an indoor smoker is provided. The indoor smoker includes a smoking chamber, a fresh air supply duct extending between a fresh air inlet and a fresh air outlet and being configured for receiving a flow of fresh air, a firebox defining a firebox inlet, a firebox outlet, and a smoldering chamber for receiving combustible material and generating a flow of smoke, an exhaust duct extending between a chamber outlet and a discharge vent, and a rotary valve operably coupled to the fresh air outlet, the firebox outlet, and the chamber outlet for regulating the flow of fresh air and the flow of smoke. The method includes positioning the rotary valve in a smoking position where the fresh air outlet is blocked and the smoldering chamber is in fluid communication with the smoking chamber, positioning the rotary valve in an evacuation position where the firebox outlet is blocked and the fresh air supply duct is in fluid communication with the smoking chamber, and positioning the rotary valve in a pause position where the firebox outlet is partially open to the exhaust duct and the fresh air outlet is partially open to the smoking chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. In addition, as used herein, terms of approximation, such as "approximately," "substantially," or "about," refer to being within a ten percent margin of error. Furthermore, the term "smoke" is generally used to refer to the flow of air, smoke, combustion byproducts, or any combination thereof through an appliance.

Figure 1:
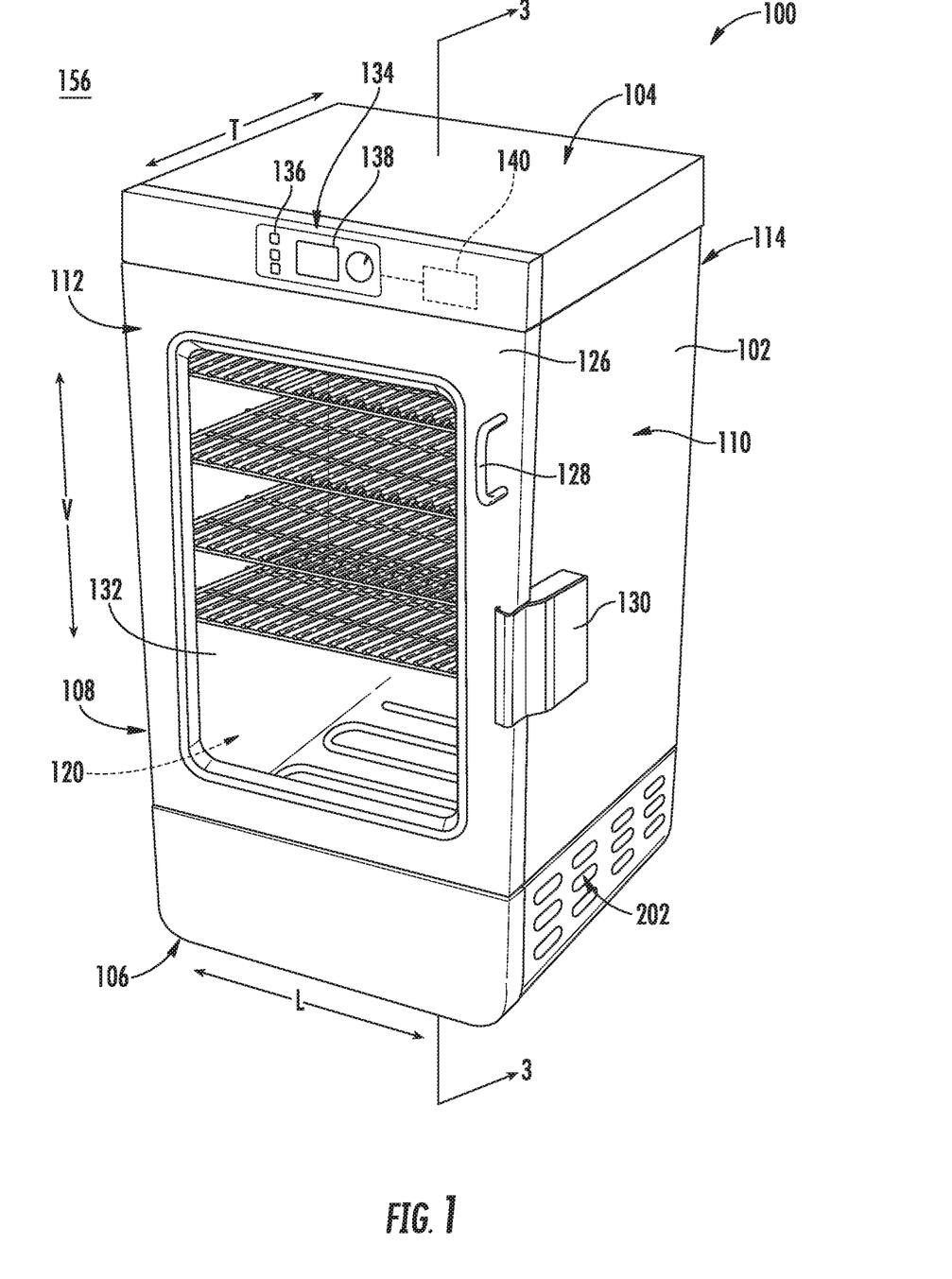
FIG. 1 provides a perspective view of an indoor smoker with a door in a closed position in accordance with an example embodiment of the present disclosure.
Figure 2:
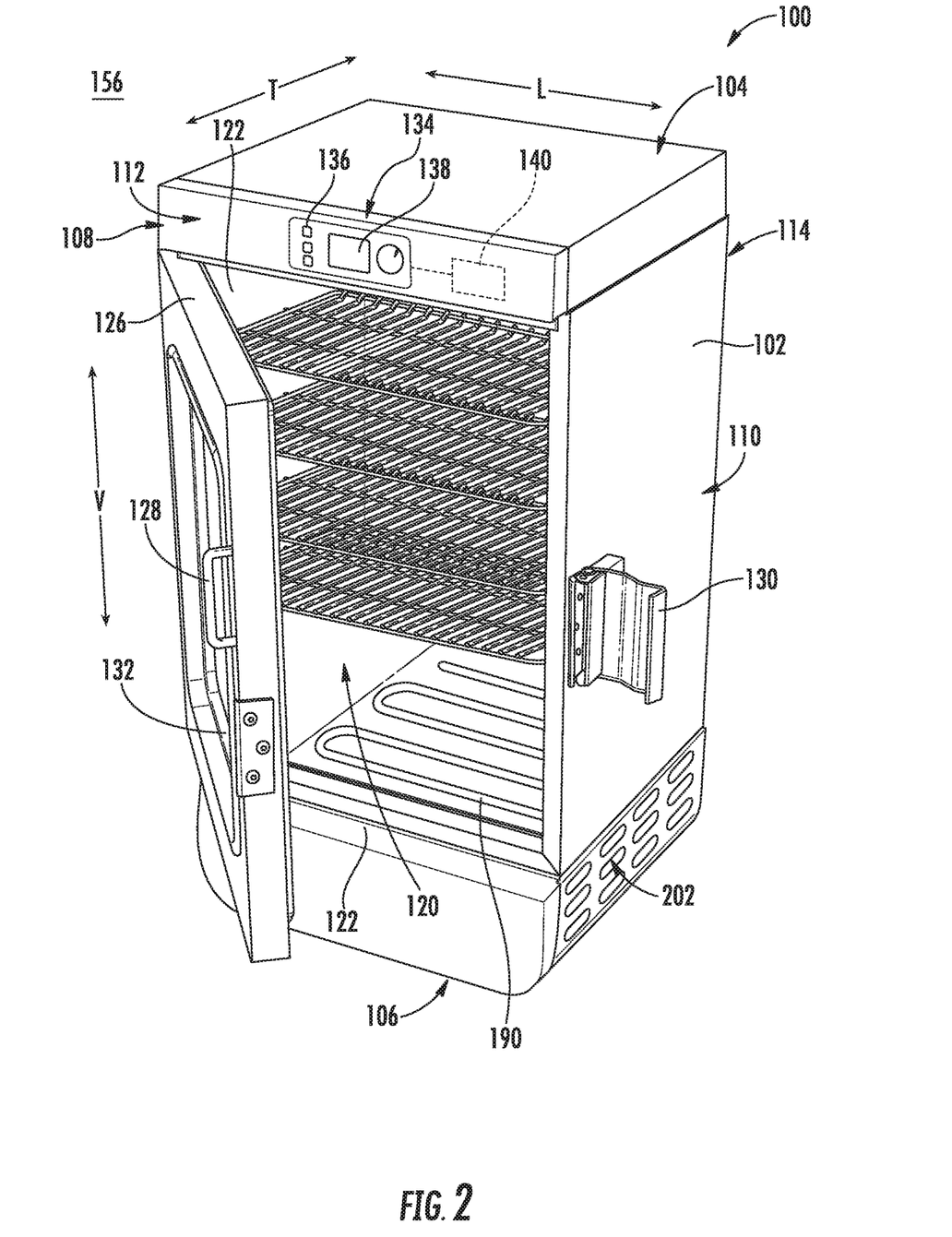
FIG. 2 provides a perspective view the exemplary indoor smoker of FIG. 1 with the door opened.

FIGS. 1 and 2 provide perspective views of an indoor smoker 100 according to an exemplary embodiment of the present subject matter with the door in the closed position and the open position, respectively. Indoor smoker 100 generally defines a vertical direction V, a lateral direction L, and a transverse direction T, each of which is mutually perpendicular, such that an orthogonal coordinate system is generally defined. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulating gap defined between chamber walls 122 and cabinet 102. According to an exemplary embodiment, the insulation gap is filled with insulating material 124 (see FIG. 3), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to regulate a flow of smoke or heated air in an appliance.

Figure 3:
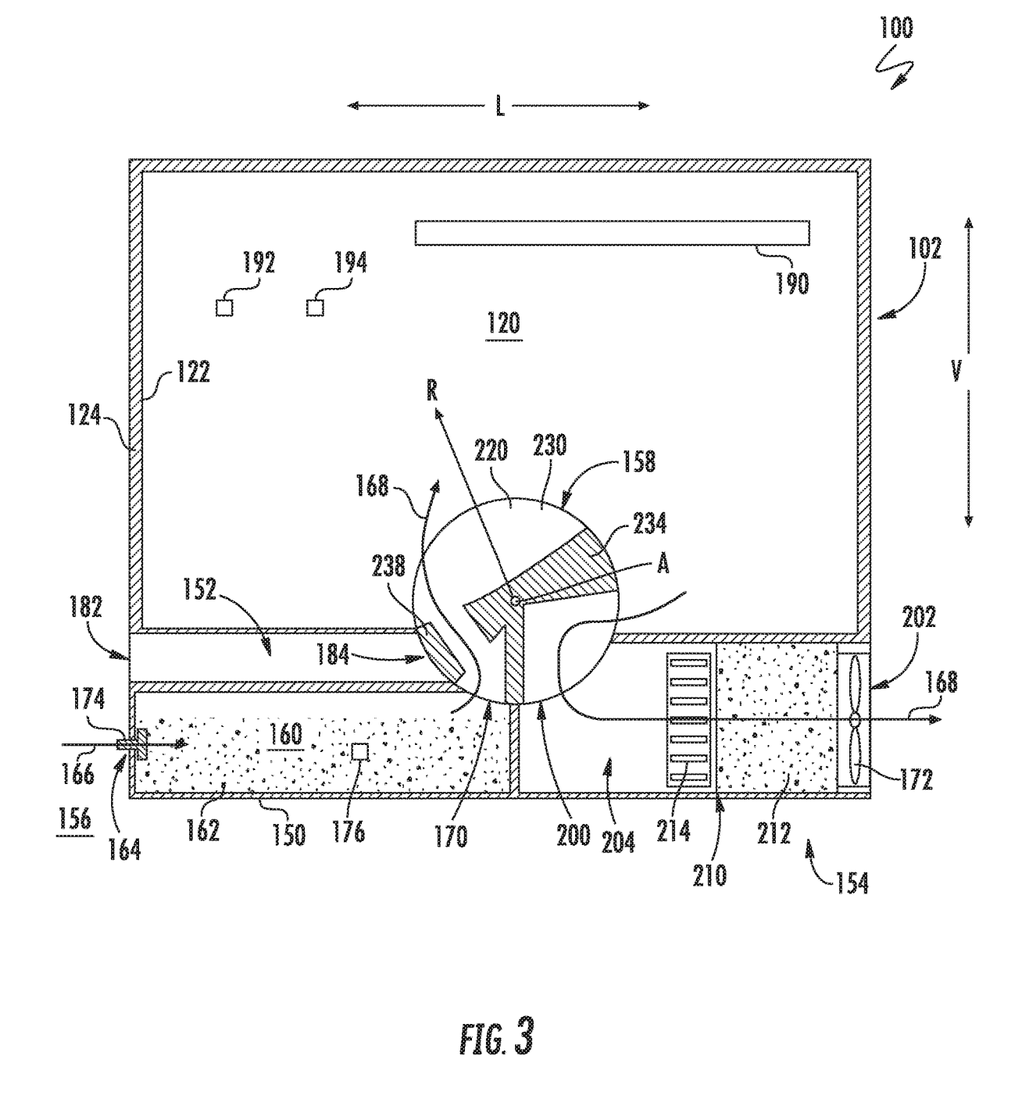
FIG. 3 provides a schematic, cross-sectional view of the exemplary indoor smoker of FIG. 1 taken along Line 3-3 of FIG. 1.

Referring now also to FIG. 3, various internal components of indoor smoker 100 and their respective functions will be described according to an exemplary embodiment of the present subject matter. In this regard, FIG. 3 illustrates a schematic cross-sectional view of indoor smoker 100 taken along Line 3-3 of FIG. 1. As shown, indoor smoker 100 generally includes smoking chamber 120 for receiving items to be cooked/smoked, a firebox 150 for generating smoke, a fresh air supply duct 152 for providing fresh air, and an exhaust system 154 for safely discharging that the air and/or smoke into an indoor environment 156 (i.e., outside of indoor smoker 100). In addition, as will be described in detail below, indoor smoker 100 includes a flow regulating device 158 that is operably coupled to smoking chamber 120, firebox 150, fresh air supply duct 152, and exhaust system 154 for regulating or directing air and/or smoke within cabinet 102. Each of these systems and components will be described in detail below.

Referring still to FIG. 3, firebox 150 generally defines a smoldering chamber 160 which is configured for receiving combustible material 162. As used herein, "combustible material" is generally used to refer to any suitable material positioned within smoldering chamber 160 for generating smoke. Specifically, according to exemplary embodiments, combustible material 162 includes wood or wood byproducts, such as wood chunks, wood chips, wood pellets, or wood resin. According to the exemplary embodiment, firebox 150 may include a door (not shown) which is pivotally mounted on top or on a side of firebox 150 for providing selective access to smoldering chamber 160, e.g., to add additional combustible material 162.

As best illustrated in FIG. 3, firebox 150 defines an air inlet or a firebox inlet 164 for receiving air to support the combustion or smoldering process. Specifically, firebox inlet 164 is configured for receiving a flow of combustion air (indicated by reference numeral 166 in FIG. 3) from the ambient environment 156 surrounding indoor smoker 100 or from another air supply source. During a smoking process, combustible material 162 is ignited and the flow of combustion air 166 supports the smoldering process to generate a flow of smoke (indicated by reference numeral 168 in FIG. 3). Firebox 150 further defines a firebox outlet 170 for providing a flow of smoke 168 into smoking chamber 120 during a smoking operation, as will be described in detail below.

Indoor smoker 100 further includes an air handler 172 for urging the flow of combustion air 166 into smoldering chamber 160 through firebox inlet 164 for facilitating the smoldering process and smoke generating process. In addition, indoor smoker 100 may further include features for preventing or regulating the flow of combustion air 166 from entering indoor smoker 100 from environment 156 when the flow of such air is not desired. In this regard, for example, indoor smoker 100 may include a firebox check valve 174 which is operably coupled to firebox inlet 164. In general, this check valve prevents the flow of combustion air 166 from entering smoldering chamber 160 when not desired.

For example, firebox check valve 174 may have a "cracking pressure," which is used herein to refer to the pressure, or more precisely the negative pressure, required within smoldering chamber 160 to open firebox check valve 174. In this manner, firebox check valve 174 may be designed to permit the flow of combustion air 166 only when air handler 172 is operating and urging air through smoldering chamber 160, thus facilitating the quick and effective asphyxiation of combustible material 162 within smoldering chamber 160 when desired.

Referring still to FIG. 3, firebox 150 includes one or more smoldering heaters 176 which are positioned in smoldering chamber 160 or otherwise placed in thermal communication with combustible material 162 stored in smoldering chamber 160 for smoldering combustible material 162. Smoldering heater 176 may include one or more heating elements such as electric resistance heating elements, gas burners, microwave heating elements, halogen heating elements, or suitable combinations thereof. According to an exemplary embodiment, smoldering heaters 176 are cartridge heaters or a silicon nitride igniters.

As used herein, the verb "smolder" or variations thereof is intended to refer to burning a combustible material (e.g., combustible material 162) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 176 positioned within smoldering chamber 160. For typical combustible material used in smokers, e.g., wood and wood byproducts, a typical smoldering temperature is between about 650° F. and 750° F. However, the exact temperature may vary depending on the combustible material used, the air flow rate through smoldering chamber 160, the level of combustible material 162, and other factors.

Referring still to FIG. 3, indoor smoker 100 further includes fresh air supply duct 152 for providing a flow of fresh air (indicated by reference numeral 180 in FIG. 3) into smoking chamber 120. Specifically, for example, fresh air supply duct 152 may extend between a fresh air inlet 182 and a fresh air outlet 184 and may be positioned above firebox 150. When air handler 172 is operating and fresh air outlet 184 is open, the flow of fresh air 180 may pass into smoking chamber 120, e.g., to perform a cold smoking process or to evacuate the smoking chamber 120, as described in more detail below.

In order to ensure a desirable cooking temperature within smoking chamber 120, indoor smoker 100 further includes a chamber heater 190 that is positioned within or otherwise in thermal communication with smoking chamber 120 for regulating the temperature in smoking chamber 120. In general, chamber heater 190 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 190 is operated independently of firebox 150 (e.g., as described below), smoking chamber 120 may be maintained at any suitable temperature during a smoking process. More specifically, for example, chamber heater 190 may be turned off or on a very low setting for smoking cheeses or may be turned on high for quickly cooking and smoking meats.

In some embodiments, indoor smoker 100 also includes one or more sensors that may be used to facilitate improved operation of the appliance, such as described below. For example, indoor smoker 100 may include one or more temperature sensors and/or humidity sensors which are generally operable to measure the internal temperature and humidity in indoor smoker 100, e.g., within smoking chamber 120 and/or smoldering chamber 160. More specifically, as illustrated, indoor smoker 100 includes a temperature sensor 192 and a humidity sensor 194 positioned within smoking chamber 120 and being operably coupled to controller 140. In some embodiments, controller 140 is configured to vary operation of chamber heater 190 based on one or more temperatures detected by temperature sensor 192 or humidity measurements from humidity sensor 194.

As described herein, "temperature sensor" may refer to any suitable type of temperature sensor. For example, the temperature sensors may be thermocouples, thermistors, or resistance temperature detectors. Similarly, "humidity sensor" may refer to any suitable type of humidity sensor, such as capacitive digital sensors, resistive sensors, and thermal conductivity humidity sensors. In addition, temperature sensor 192 and humidity sensor 194 may be mounted at any suitable location and in any suitable manner for obtaining a desired temperature or humidity measurement, either directly or indirectly. Although exemplary positioning of certain sensors is described below, it should be appreciated that indoor smoker 100 may include any other suitable number, type, and position of temperature and/or humidity sensors according to alternative embodiments.

As mentioned briefly above, indoor smoker 100 further includes an exhaust system 154 which is generally configured for safely discharging the flow of smoke 168 from indoor smoker 100. Specifically, according to the illustrated embodiment, exhaust system 154 generally extends between chamber outlet 200 and a discharge vent 202 defined by cabinet 102 for directing the flow of smoke 168 from smoking chamber 120 to the environment 156. Although an exemplary exhaust system 154 is described below, it should be appreciated that variations and modifications may be made while remaining within the scope of the present subject matter. For example, the routing of ducts, the position of fans and dampers, and the types of sensors used may vary according to alternative embodiments.

As shown, exhaust system 154 includes an exhaust duct 204 that generally extends between and provides fluid communication between chamber outlet 200 and discharge vent 202. Air handler 172 is operably coupled with exhaust duct 204 for urging the flow of smoke 168 through exhaust duct 204 and out of discharge vent 202 to environment 156. According to the illustrated exemplary embodiment, air handler 172 is an axial fan positioned within exhaust duct 204. However, it should be appreciated that according to alternative embodiments, air handler 172 may be positioned at any other suitable location and may be any other suitable fan type, such as an tangential fan, a centrifugal fan, etc.

In addition, according to an exemplary embodiment, air handler 172 is a variable speed fan such that it may rotate at different rotational speeds, thereby generating different air flow rates. In this manner, the amount of smoke drawn from smoldering chamber 160 may be continuously and precisely regulated. Moreover, by pulsing the operation of air handler 172 or throttling air handler 172 between different rotational speeds, the flow of smoke 168 drawn into smoking chamber 120 may enter from a different direction, may have a different flow velocity, or may generate a different flow pattern within smoking chamber 120. Thus, by pulsating the variable speed fan or otherwise varying its speed, the flow of smoke 168 may be randomized, thereby eliminating stagnant regions within smoking chamber 120 and better circulating the flow of smoke 168 to provide a more even cooking/smoking profile.

As illustrated, indoor smoker 100 further includes a catalytic converter 210 which is positioned within exhaust duct 204 for lowering or removing volatile organic compounds (VOCs) from the flow of smoke 168. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 210 generally includes a catalytic element 212 and a catalyst heater 214. In general, catalytic element 212 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 212 may combine oxygen ($O_2$) with carbon monoxide (CO) and unburned hydrocarbons to produce carbon dioxide ($CO_2$) and water ($H_2O$). In addition, according to exemplary embodiments, catalytic element 212 may remove nitric oxide (NO) and nitrogen dioxide ($NO_2$).

Notably, catalytic converters typically require that the catalyst be heated to a suitably high temperature in order to catalyze the necessary chemical reactions. Therefore, catalyst heater 214 is in thermal communication with catalytic element 212 for heating it to a suitable temperature, such as approximately 800° F. According to the illustrated embodiment, catalyst heater 214 is positioned upstream of catalytic element 212 to provide thermal energy through convection. However, it should be appreciated that according to alternative embodiments, catalyst heater 214 may be in direct contact with catalytic element 212 to provide thermal energy through conduction, or may be thermally coupled to catalytic element 212 in any other suitable manner.

Thus, during operation of indoor smoker 100, air handler 172 draws the flow of combustion air 166 into smoldering chamber 160 through firebox inlet 164. The flow of combustion air 166 and combustible material 162 in the smoldering chamber 160 generate the flow of smoke 168 which is drawn into smoking chamber 120 as described below. The flow of smoke 168 passes through smoking chamber 120 for performing a smoking process on food items positioned therein before exiting smoking chamber 120 through chamber outlet 200. Air handler 172 and continues to urge the flow of smoke 168 through catalytic converter 210 and exhaust duct 204 before passing out discharge vent 202.

Referring now to FIGS. 3 through 8, flow regulating device 158 will be described according to an exemplary embodiment of the present subject matter. In general, flow regulating device 158 is positioned within cabinet 102 and is configured for selectively directing the flow of smoke 168 and the flow of fresh air 180 throughout smoking chamber 120 and/or exhaust duct 204. Although flow regulating device 158 is described herein as being used with indoor smoker 100, it should be appreciated that aspects of the present subject matter may be applied to other indoor smokers, outdoor smokers, or any other appliance to facilitate flow regulation of gases and fluids.

Figure 4:
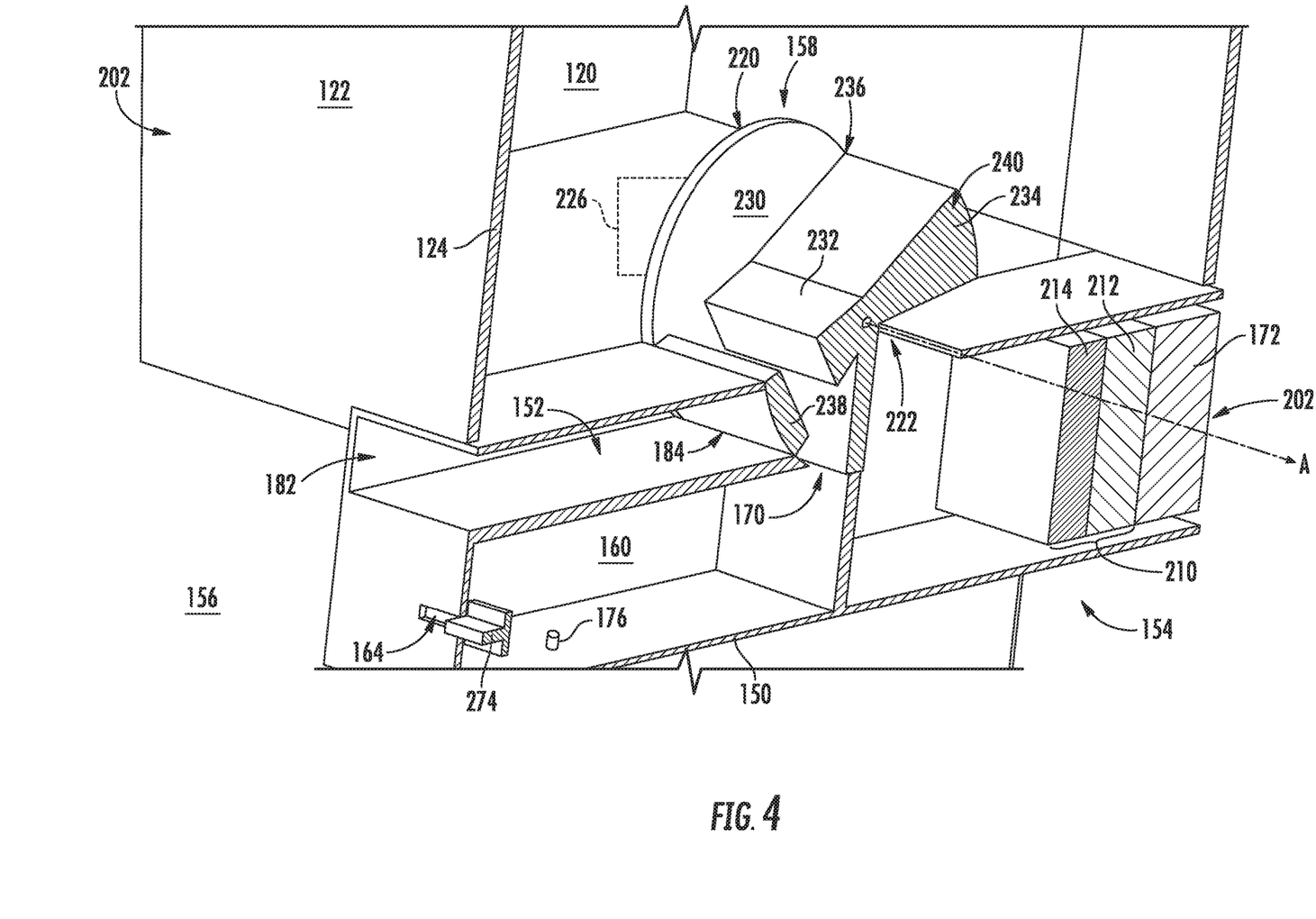
FIG. 4 provides a perspective view of a flow regulating assembly of the exemplary indoor smoker of FIG. 1 according to an exemplary embodiment of the present subject matter.

In general, flow regulating device 158 is operably coupled to fresh air outlet 184, firebox outlet 170, and chamber outlet 200 for regulating the flow of smoke 168 and/or the flow of fresh air 180 within indoor smoker 100. More specifically, according to the exemplary embodiment, flow regulating device 158 includes a rotary valve 220 that is rotatably mounted within smoking chamber 120. In this regard, for example, smoking chamber 120 may define an opening 222 defined in a bottom wall 122 of smoking chamber 120 through which the flow of smoke 168 and/or the flow of fresh air 180 may pass into and/or out of smoking chamber 120. In addition, rotary valve 220 may be positioned over opening 222 and may define a plurality of flow passages 224 for selectively directing the flow of smoke 168 in the flow of fresh air 180 during a smoking process.

According to the illustrated embodiment, fresh air supply duct 152, firebox 150, and exhaust duct 204 are all positioned below smoking chamber 120 along the vertical direction V. In this regard, opening 222 is defined in a center of bottom wall 122 of smoking chamber 120 along the lateral direction L. Fresh air supply duct 152 is a stacked on top of firebox 150 and both extend from first side 108 of cabinet 102 along the lateral direction L toward opening 222. By contrast, exhaust duct 204 extends from opening 222 along the lateral direction L toward second side 110. However, it should be appreciated that the illustrated embodiment is used only for the purpose of explaining aspects of the present subject matter. Variations and modifications may be made to the size, position, and orientation of these components while remaining within the scope of the present subject matter.

Notably, rotary valve 220 may be used to regulate the flow of smoke 168 and the flow of fresh air 180 by adjusting its angular position to selectively align flow passages 224 with one or more of fresh air outlet 184, firebox outlet 170, and chamber outlet 200. As illustrated, rotary valve 220 rotates about an axis of rotation A which is defined substantially parallel to the transverse direction T. In addition, as shown schematically in FIG. 4, flow regulating device 158 may include a motor 226 mechanically coupled to rotary valve 220 and being configured for adjusting the angular position of rotary valve 220. In this regard, for example, a user may program a smoking process using user interface panel 134 and controller 140 may automate operation of rotary valve 220 by controlling motor 226.

As used herein, "motor" may refer to any suitable drive motor and/or transmission assembly for rotating a system component. For example, motor 226 may be a brushless DC electric motor, a stepper motor, or any other suitable type or configuration of motor. Alternatively, for example, motor 226 may be an AC motor, an induction motor, a permanent magnet synchronous motor, or any other suitable type of AC motor. In addition, motor 226 may include any suitable transmission assemblies, clutch mechanisms, or other components. According to still other embodiments, motor 226 may be omitted altogether, and rotary valve 220 may be rotated manually by a user of indoor smoker 100, e.g., using a manual knob or user input device 136.

According to the illustrated embodiment, rotary valve 220 is a substantially cylindrical valve that is seated over fresh air outlet 184, firebox outlet 170, and chamber outlet 200, which together define a curved opening 222 for receiving rotary valve 220. Specifically, rotary valve 220 is positioned such that axis of rotation A is positioned just above or substantially in the same horizontal plane has bottom wall 122 of smoking chamber 120.

As illustrated, rotary valve 220 generally includes two circular sidewalls 230 spaced apart along the axis of rotation A and a hub 232 that extends along the axis of rotation A between sidewalls 230. In addition, a plurality of partitions 234 extend from hub 232 outward toward a peripheral edge 236 of rotary valve 220. Furthermore, an arcuate flange 238 is positioned at peripheral edge 236 of rotary valve 220 and extends between sidewalls 230 along the axis of rotation A. In general, hub 232, partitions 234, and arcuate flange 238 together define the plurality of flow passages 224 for directing the flow of smoke 168 and the flow of fresh air 180, as will be described in more detail below.

Notably, in order to maintain a reasonable fluid seal with rotary valve 220, fresh air outlet 184, firebox outlet 170 and chamber outlet 200 are generally curved to define a similar radius to rotary valve 220. In addition, the distal ends of partitions 234 may generally be curved or otherwise configured for generating a seal with the walls or ducts defining these outlets. For example, at least one of the plurality of partitions 234 may define a flared distal end 240. In this regard, flared distal end 240 may define a width 242 at peripheral edge 236 that is sufficient to block firebox outlet 170 when positioned over firebox outlet 170. Similarly, arcuate flange 238 may define a width 244 sufficient to block fresh air outlet 184 when positioned over fresh air outlet 184.

According to the illustrated embodiment, hub 232 is defined at the axis of rotation A and partitions 234 extend from hub 232 substantially along a radial direction R. However, it should be appreciated that this is only one exemplary configuration of rotary valve 220 and is not intended to limit the scope of the present subject matter. For example, any other suitable configuration of walls or flow directing features that extend along the axis of rotation A may define flow passages 224 suitable for directing the flow of smoke 168 and the flow of fresh air 180. Moreover, it should be appreciated that according to alternative embodiments, flow regulating device 158 need not be a rotary valve 220 at all. For example, flow regulating device 158 may be a system of dampers, solenoid valves, or any other suitable combination of flow control devices.

As will be described in detail below, flow regulating device 158, or more specifically rotary valve 220, may be rotatable or movable between several angular positions in order to manipulate the flow of smoke 168 and the flow of fresh air 180 within indoor smoker 100. Specifically, for example, rotary valve 220 may be moved between a smoking position, and evacuation/termination positioned, a pause position, and/or a cold smoking position. Although operation of indoor smoker 100 is described below as using these four operating positions, it should be appreciated that the present subject matter is not limited to the operating modes described herein.

Now that the construction and configuration of indoor smoker 100 has been described according to an exemplary embodiment of the present subject matter, an exemplary method 300 for regulating a flow of air and/or smoke within or otherwise operating an indoor smoker will be described according to an exemplary embodiment of the present subject matter. Method 300 can be implemented by controller 140 and may be used to operate indoor smoker 100, or any other smoker or cooking appliance. It should be appreciated that the exemplary method 300 is discussed herein only to describe exemplary aspects of the present subject matter, and is not intended to be limiting.

Figure 5:
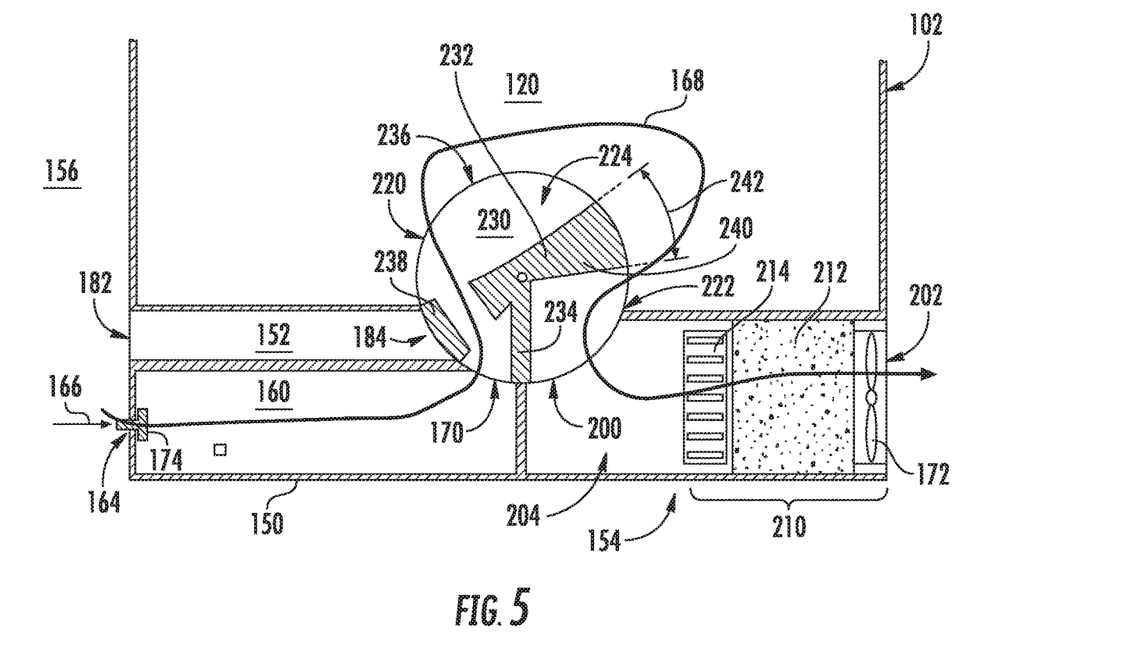
FIG. 5 provides a schematic, front view of the flow regulating assembly of FIG. 4, with a rotary valve in a smoking position.
Figure 9:
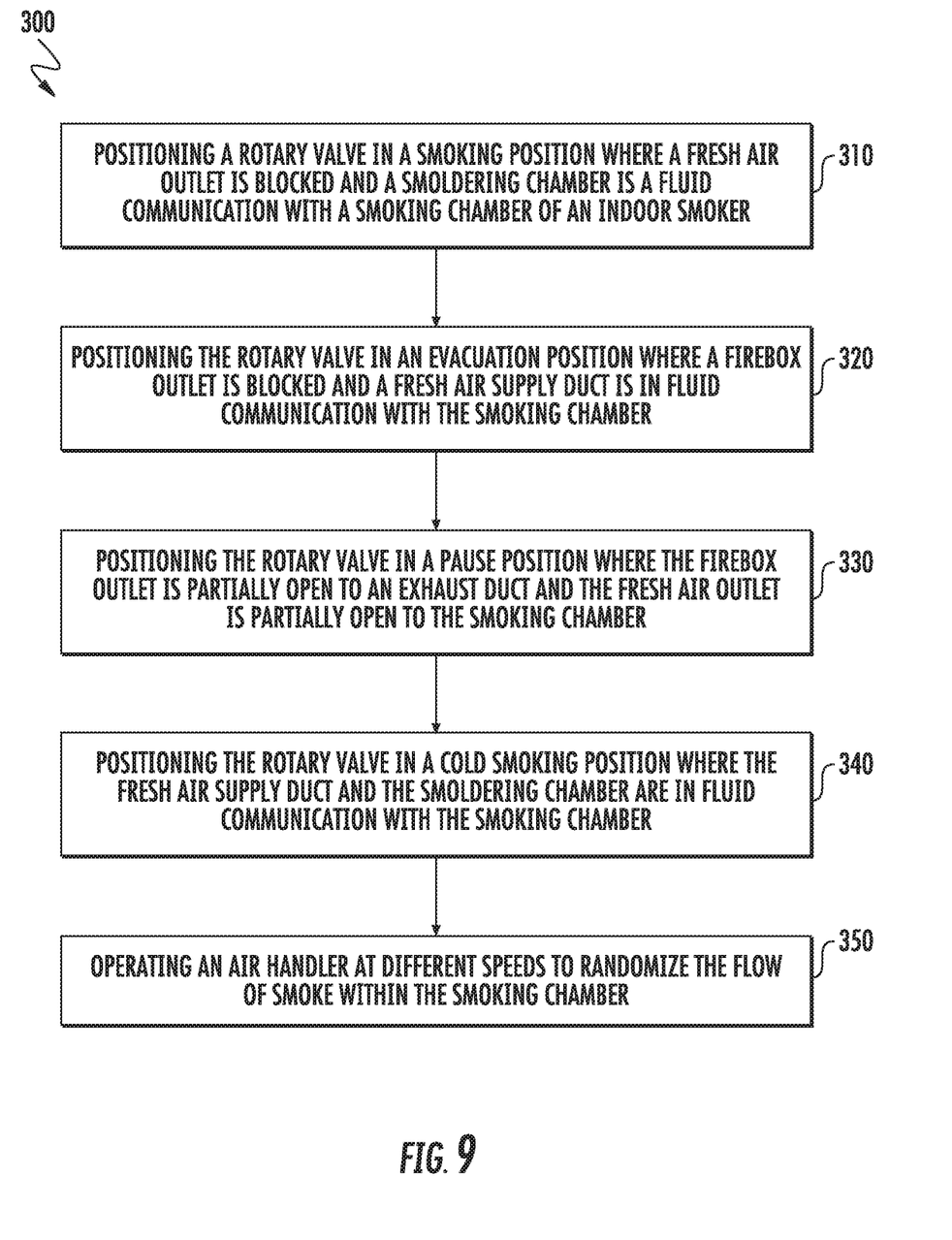
FIG. 9 is a method of operating an indoor smoker according to an example embodiment of the present subject matter.

Referring now to FIG. 9, method 300 includes, at step 310, positioning a rotary valve in a smoking position where a fresh air outlet is blocked and a smoldering chamber is in fluid communication with a smoking chamber of an indoor smoker. Continuing the example from above, motor 226 may be used to rotate rotary valve 220 to the smoking position which is illustrated in FIG. 5. As shown, when rotary valve 220 is in the smoking position, arcuate flange 238 blocks or substantially blocks fresh air outlet 180 for such that the flow of fresh air 180 through fresh air supply duct 152 is blocked. However, firebox outlet 170 and chamber outlet 200 are open and air handler 172 is operating to draw the flow of combustion air 166 into smoldering chamber 160 to generate the flow of smoke 168. The flow of smoke 168 is then drawn through rotary valve 220 and opening 222 into smoking chamber 120 to perform a smoking process before being evacuated through exhaust duct 204.

Figure 6:
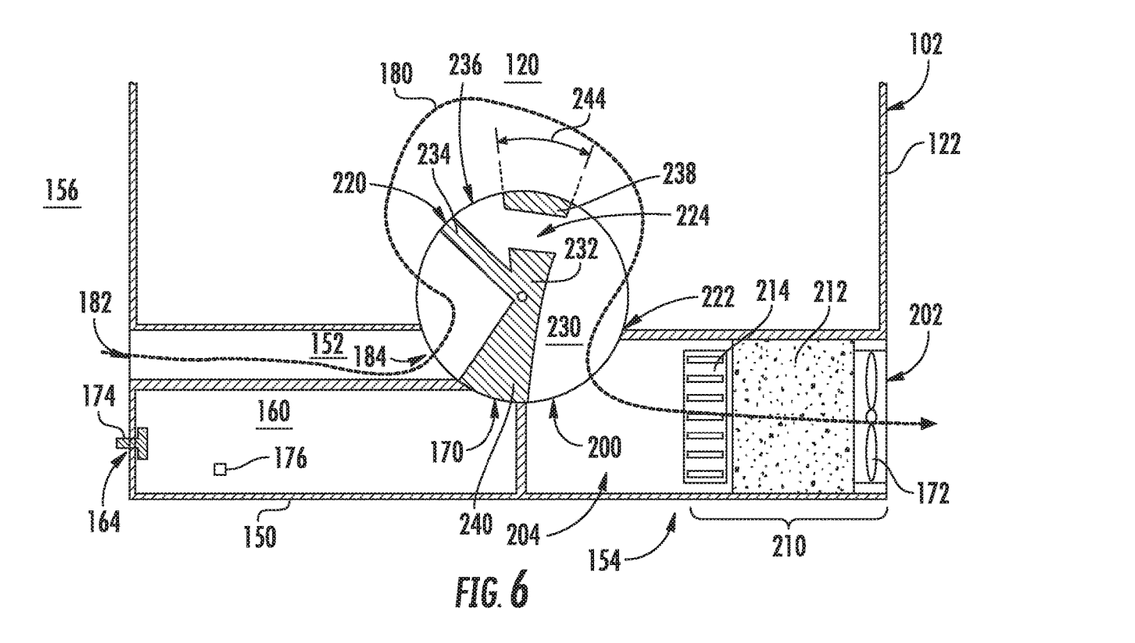
FIG. 6 provides a schematic, front view of the flow regulating assembly of FIG. 4, with the rotary valve in an evacuating position.

Step 320 includes positioning the rotary valve in an evacuation position where a firebox outlet is blocked and a fresh air supply duct is in fluid communication with the smoking chamber. Referring for example to FIG. 6, when rotary valve 220 is in the evacuation position, flared distal end 240 blocks or substantially blocks firebox outlet 170 while flow passages 224 provide fluid communication between fresh air supply duct 152 and smoking chamber 120. Thus, air handler 172 may be operated to draw the flow of fresh air 180 into smoking chamber 120 through fresh air outlet 184 and out through exhaust duct 204. Simultaneously, smoldering chamber 160 is sealed at firebox outlet 170 and firebox check valve 174 prevents the flow of combustion air 166 from entering firebox inlet 164. As such, combustible material 162 is asphyxiated to prevent further smoke generation or consumption of combustible material 162. As a result, step 320 serves to both evacuate smoke from smoking chamber 120 and to terminate the smoking process altogether.

Figure 7:
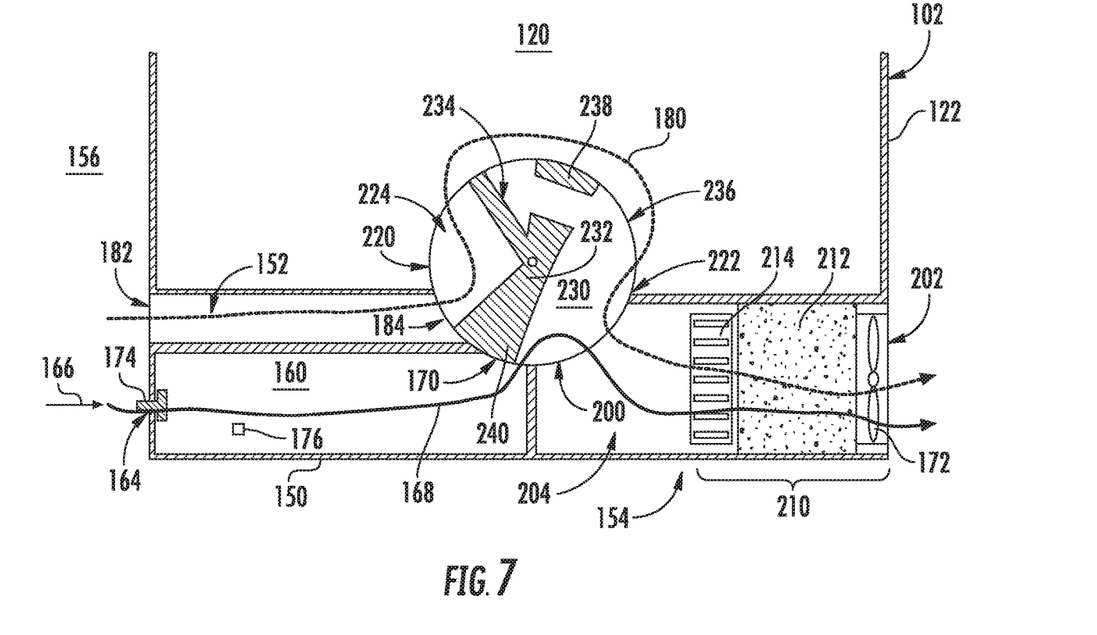
FIG. 7 provides a schematic, front view of the flow regulating assembly of FIG. 4, with the rotary valve in a pause position.

Step 330 includes positioning the rotary valve in a pause position where the firebox outlet is partially open to an exhaust duct and the fresh air outlet is partially open to the smoking chamber. For example, as best shown in FIG. 7, when rotary valve 220 is in the pause position, flared distal end 240 is positioned over a wall between firebox outlet 170 and fresh air outlet 184, thereby partially restricting the flow of smoke 168 and the flow of fresh air 180, respectively. Specifically, as illustrated, firebox outlet 170 is more restricted than fresh air outlet 184 such that a sufficient amount of the flow of fresh air 180 may enter and evacuate smoking chamber 120, while just enough of the flow of combustion air 166 may pass into firebox 150 to support the smoldering process without asphyxiating the combustible material 162. Thus, step 330 may be useful when a user desires to access cooking chamber 120, e.g. to add food or check an internal temperature of food, without completely terminating the smoking process.

Figure 8:
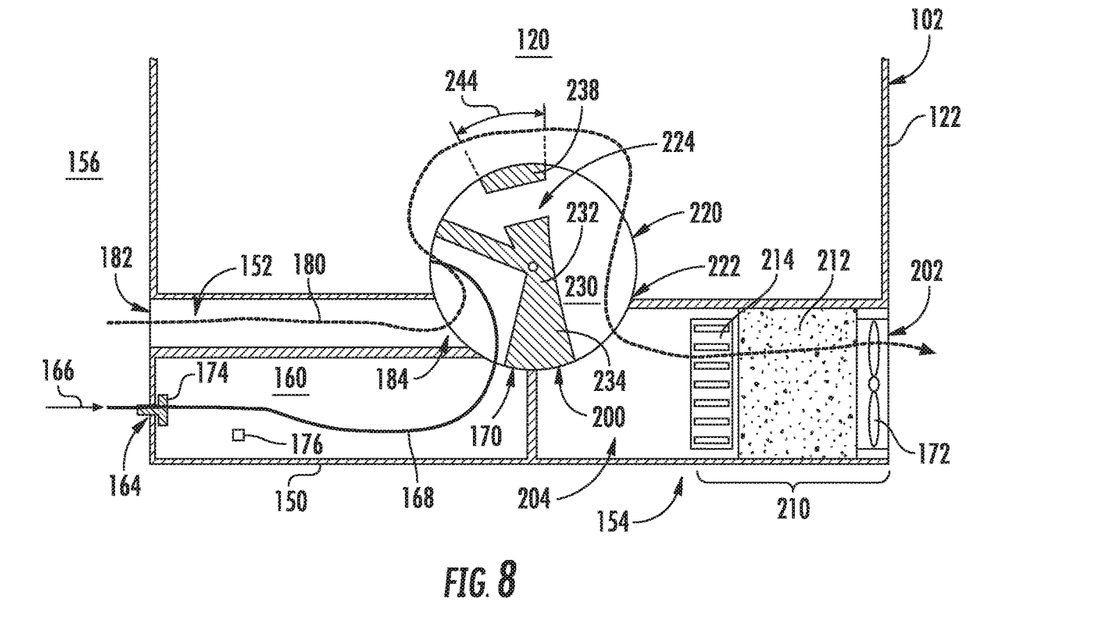
FIG. 8 provides a schematic, front view of the flow regulating assembly of FIG. 4, with the rotary valve in a cold smoking position.

Step 340 includes positioning the rotary valve in a cold smoking position where the fresh air supply duct and the smoldering chamber are in fluid communication with the smoking chamber. Referring to FIG. 8, when rotary valve 220 is positioned in the cold smoking position, fresh air outlet 184 is fully open to provide a large flow of fresh air 180 into smoking chamber 120. In addition, firebox outlet 170 is at least partially open to provide a flow of smoke 168 into smoking chamber 120 along with the flow of fresh air 180. In this manner, a small amount of smoke is mixed with a high amount of fresh air, e.g., to produce cold smoke for smoking cheeses, fruits, etc. Notably, the ratio of the flow of fresh air 180 to the flow of smoke 168 entering smoking chamber 120 in the cold smoking position may be regulated by adjusting the angular position of rotary valve 220.

Step 350 includes operating an air handler at different speeds to randomize the flow of smoke within the smoking chamber. In this regard, as described in detail above, air handler 172 is a variable speed fan that may be selectively throttled, operated at different speeds, or pulsated to regulate the manner in which the flow of smoke 168 and/or the flow of fresh air 180 flow within smoking chamber 120. For example, changing the fan speed may cause the flow of smoke 168 to enter smoking chamber 120 along a different direction and at a different flow velocity, thereby randomizing the flow of smoke 168 within smoking chamber 120 and eliminating stagnant regions to provide a more even cooking/smoking profile.

FIG. 9 depicts an exemplary method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using indoor smoker 100 as an example, it should be appreciated that these methods may be applied to regulate smoke in any other smoking appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker defining a vertical, a lateral, and a transverse direction, the indoor smoker comprising:
    a cabinet;
    a smoking chamber positioned within the cabinet;
    a fresh air supply duct extending between a fresh air inlet and a fresh air outlet and being configured for receiving a flow of fresh air;
    a firebox defining a firebox inlet, a firebox outlet, and a smoldering chamber for receiving combustible material and generating a flow of smoke;
    an exhaust duct extending between a chamber outlet and a discharge vent;
    a flow regulating device, the fresh air outlet and the firebox outlet being adjacent to and distinct from each other, each of the fresh air outlet and the firebox outlet terminating at the flow regulating device, the flow regulating device being further operably coupled to the chamber outlet for regulating the flow of fresh air and the flow of smoke within the cabinet; and
    a catalytic converter positioned within the exhaust duct for lowering volatile organic compounds within the flow of smoke.

2. The indoor smoker of claim 1, wherein the flow regulating device comprises a rotary valve defining a plurality of flow passages for directing the flow of fresh air and the flow of smoke.

3. The indoor smoker of claim 2, wherein the flow regulating device comprises:
    a motor mechanically coupled to the rotary valve and being configured for adjusting an angular position of the rotary valve.

4. The indoor smoker of claim 2, wherein the rotary valve comprises:
    a hub extending along an axis of rotation;
    a plurality of partitions extending from the hub outward toward a peripheral edge of the rotary valve to define the plurality of flow passages; and
    an arcuate flange positioned at the peripheral edge of the rotary valve.

5. The indoor smoker of claim 4, wherein the rotary valve comprises:
    two circular sidewalls spaced apart along the axis of rotation, the hub extending between the two circular sidewalls.

6. The indoor smoker of claim 4, wherein each of the plurality of partitions extends substantially along a radial direction, at least one of the plurality of partitions defines a flared distal end.

7. The indoor smoker of claim 6, wherein the flared distal end defines a width sufficient to block the firebox outlet when positioned over the firebox outlet.

8. The indoor smoker of claim 1, wherein the fresh air supply duct, the firebox, and the exhaust duct are positioned below the smoking chamber along the vertical direction.

9. The indoor smoker of claim 1, wherein the flow regulating device is movable between:
- a smoking position where the fresh air outlet is blocked and the smoldering chamber is in fluid communication with the smoking chamber;
- an evacuation position where the firebox outlet is blocked and the fresh air supply duct is in fluid communication with the smoking chamber; and
- a pause position where the firebox outlet is partially open to the exhaust duct and the fresh air outlet is partially open to the smoking chamber.

10. The indoor smoker of claim 9, wherein the flow regulating device is further movable to:
- a cold smoking position where the fresh air supply duct and the smoldering chamber are in fluid communication with the smoking chamber.

11. The indoor smoker of claim 10, wherein adjusting the flow regulating device adjusts a ratio of the flow of fresh air to the flow of smoke entering the smoking chamber in the cold smoking position.

12. The indoor smoker of claim 1, comprising:
- an air handler operably coupled with the exhaust duct for urging at least one of the flow of fresh air and the flow of smoke through the exhaust duct.

13. The indoor smoker of claim 12, wherein the air handler comprises:
- a variable fan operating at different speeds to randomize the flow of smoke within the smoking chamber.

14. The indoor smoker of claim 1, comprising:
- a firebox check valve operably coupled to the firebox inlet, the firebox check valve having a cracking pressure that is sufficient to prevent a flow of combustion air into the smoldering chamber when the firebox outlet is blocked.

15. A method of operating an indoor smoker, the indoor smoker comprising a smoking chamber, a fresh air supply duct extending between a fresh air inlet and a fresh air outlet and being configured for receiving a flow of fresh air, a firebox defining a firebox inlet, a firebox outlet, and a smoldering chamber for receiving combustible material and generating a flow of smoke, an exhaust duct extending between a chamber outlet and a discharge vent, and a rotary valve operably coupled to the fresh air outlet, the firebox outlet, and the chamber outlet for regulating the flow of fresh air and the flow of smoke, the method comprising:
- positioning the rotary valve in a smoking position where the fresh air outlet is blocked and the smoldering chamber is in fluid communication with the smoking chamber;
- positioning the rotary valve in an evacuation position where the firebox outlet is blocked and the fresh air supply duct is in fluid communication with the smoking chamber; and
- positioning the rotary valve in a pause position where the firebox outlet is partially open to the exhaust duct such that the flow of smoke bypasses the smoking chamber and the fresh air outlet is partially open to the smoking chamber.

16. The method of claim 15, further comprising:
- positioning the rotary valve in a cold smoking position where the fresh air supply duct and the smoldering chamber are in fluid communication with the smoking chamber.

17. The method of claim 15, wherein the indoor smoker further comprises an air handler operably coupled with the exhaust duct for urging at least one of the flow of fresh air and the flow of smoke through the exhaust duct, the method further comprising:
- operating the air handler at different speeds to randomize the flow of smoke within the smoking chamber.

18. The method of claim 15, wherein the indoor smoker comprises a motor mechanically coupled to the rotary valve, wherein positioning the rotary valve comprises:
- operating the motor to adjust an angular position of the rotary valve.

19. The method of claim 15, wherein the rotary valve comprises:
- two circular sidewalls spaced apart along an axis of rotation;
- a hub extending between the two circular sidewalls;
- a plurality of partitions extending from the hub outward toward a peripheral edge of the rotary valve to define the plurality of flow passages, at least one of the plurality of partitions defines a flared distal end; and
- an arcuate flange positioned at the peripheral edge of the rotary valve.

* * * * *